(12) United States Patent
Froment et al.

(10) Patent No.: US 9,648,156 B2
(45) Date of Patent: May 9, 2017

(54) TERMINAL DOCKING DEVICE

(71) Applicant: INGENICO GROUP, Paris (FR)

(72) Inventors: Marion Froment, Loriol (FR); Fabrice Fleury, Toulaud (FR); Sylvain Barneron, Bourg les Valence (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 14/886,803

(22) Filed: Oct. 19, 2015

(65) Prior Publication Data

US 2016/0112558 A1 Apr. 21, 2016

(30) Foreign Application Priority Data

Oct. 17, 2014 (FR) ..................... 14 59998

(51) Int. Cl.
| | | |
|---|---|---|
| G06F 15/16 | (2006.01) |
| H04M 1/725 | (2006.01) |
| G06F 1/16 | (2006.01) |
| H04M 1/04 | (2006.01) |
| G06F 13/40 | (2006.01) |
| G06F 13/42 | (2006.01) |
| G06Q 20/32 | (2012.01) |
| H01R 24/60 | (2011.01) |
| G07F 7/08 | (2006.01) |
| H01R 107/00 | (2006.01) |

(52) U.S. Cl.
CPC ...... *H04M 1/72575* (2013.01); *G06F 1/1632* (2013.01); *G06F 13/4081* (2013.01); *G06F 13/4282* (2013.01); *G06Q 20/322* (2013.01); *G07F 7/088* (2013.01); *H01R 24/60* (2013.01); *H04M 1/04* (2013.01); *H04M 1/72527* (2013.01); *H01R 2107/00* (2013.01)

(58) Field of Classification Search
CPC .............. G06F 1/1632; G06F 13/4282; G06F 13/4081; G06Q 20/32; G06Q 20/322; H04M 1/04; H04M 1/72527; H04M 1/72575; H01R 24/60; H01R 2107/00
USPC ........... 455/406, 556.1, 556.2, 557; 439/489, 439/824, 845
See application file for complete search history.

(56) References Cited

U.S. PATENT DOCUMENTS 8,281,998 B2 * 10/2012 Tang ..................... G06Q 20/32
235/380
2007/0263348 A1 11/2007 Rutledge et al.
(Continued)

FOREIGN PATENT DOCUMENTS

DE 102007037944 A1 2/2009
EP 2095520 B1 9/2010
(Continued)

OTHER PUBLICATIONS

French Search Report and Written Opinion dated Mar. 24, 2015 for French Application No. 1459998, filed Oct. 17, 2014.
(Continued)

*Primary Examiner* — Sam Bhattacharya
(74) *Attorney, Agent, or Firm* — David D. Brush; Westman Champlin & Koehler, P.A.

(57) ABSTRACT

A device is provided for connecting a communications terminal. The device includes a male connector which is to be connected to a female connector of the communications terminal. Such a device includes a base to which the male connector is fixed, the base including at least one slide.

6 Claims, 4 Drawing Sheets

(56) References Cited

U.S. PATENT DOCUMENTS

2013/0058036 A1 3/2013 Holzer et al.
2013/0262299 A1 10/2013 Lacroix et al.
2015/0277491 A1* 10/2015 Browning ............. G06F 1/1632
                                                               361/679.44

FOREIGN PATENT DOCUMENTS

FR      2968433 A1   6/2012
WO   2009021601 A1   2/2009

OTHER PUBLICATIONS

English translation of the Written French Opinion dated Mar. 24, 2015 for French Application No. 1459998, filed Oct. 17, 2014.

* cited by examiner

TERMINAL DOCKING DEVICE

1. FIELD OF THE DISCLOSURE

The disclosure pertains to the field of payment terminals. The disclosure pertains more particularly to the field of payment terminals that have a housing to receive a communications terminal. The disclosure pertains more specifically to a device for docking and removing (or separating) such a communications terminal with and from the housing provided for this purpose in the payment terminal.

2. PRIOR ART

Recent advances in payment terminals are related to the emergence of smartphones. These smartphones have the interesting feature of possessing high computing capacity. Smartphones have therefore been much preferred by certain business professionals for use as assistants in business operations and especially in sales operations. It has thus very quickly become clear that it was worthwhile to couple this smartphone with a payment terminal in order to carry out business operations (such as for example sales operations) by means of a payment operation. This coupling of the payment terminal with the communications terminal is done at two levels; firstly, physical coupling in which the payment terminal and the smartphone are positioned back to back in a casing and secondly a communications coupling in such a way that the payment terminal and the smartphone can exchange data on payment for example. Such a device for example, is the "PAYware Mobile e315" terminal by the company "Verifone".

There is an electronic payment device of this kind known from the patent application FR2968433. This terminal 1 is shown in FIGS. 1*a* and 1*b*. Such a device comprises a smart-card reader and a housing capable of receiving and holding a portable telephone and comprising a connector for connection with this portable telephone. This device 1 also comprises a data-processing unit capable of receiving information about a payment and of exchanging data with a remote server via a telephone call made by said portable telephone. Thus, according to this prior-art document, there is an autonomous and nomadic payment device available for use anywhere (in a taxi, a private home, etc.) provided that a telephone call can be made via the cell network. However, this payment device 1 does not need to have its own communications means and especially its own SIM card and a corresponding subscription since the i device uses a classic portable telephone which the user can also use for voice communications or any other application.

As can be seen in FIG. 1*b*, a device of this kind has a housing 2 for docking the communications terminal. This housing 2 for docking has a hatch that can be used for docking and removing the communications terminal by a translational motion. The lower part of the communications terminal (the one that has a female or socket connector, for example a micro-USB connector or any other connector of this type) is inserted into the housing and then, by pushing the upper part of the communications terminal, it is completely inserted into the housing provided for this purpose. The hatch is then closed. When the female connector is completely pushed into the back of the housing, it is plugged with a corresponding male connector.

To remove the communications terminal, the hatch is opened and then, in pressing the screen of the communications terminal with his fingers, the user extracts the communications terminal from the housing (with a translational motion). The extraction is therefore done by carrying out a translational motion with the fingers while at the same time pressing on the screen of the communications terminal.

These methods of docking and separation or removal have problems. The first problem relates to the removal of the communications terminal. It will be understood indeed that it is not easy to remove the communications terminal by applying varying degrees of pressure on the screen of this terminal. There is a high risk of breakage. This risk of breakage is related to the difficulty of extracting the female connector of the communications terminal from the male connector. To overcome this problem of difficulty of docking, the "PAYware Mobile e315" terminal by the firm "Verifone" has a semi-aperture at the lower part of the housing through which a finger can be inserted to push the communications terminal out of the housing. This solution is fairly unsightly because it creates an interruption in the general rim of the housing (this approach is not suited to the often stylish design of communications terminals). In addition, this approach enables pressure to be exerted on the communications terminal even when it is in operation. This can cause problems both in the payment terminal and in the communications terminal. Besides, it does not resolve the problem of the docking of the communications terminal. As explained here above, this docking must also lead to the attaching of the female connector of the communications terminal to the male connector in the casing. Now this docking is done blindly. Indeed, the male connector is situated at the bottom of the housing. It therefore cannot be seen by the user during docking with the payment terminal. The user is therefore unable to make sure that the female connector of the communications terminal is properly connected with the male connector of the casing and also this user cannot make sure that the male connector of the casing is not deteriorated (broken, abnormally twisted, etc.)

3. SUMMARY

More particularly, the proposed solution enables a secured docking and removal of the communications terminal. This solution is based chiefly on a sliding connector. By extension, the solution relates to a payment device comprising a housing for docking a communications terminal, said docking device comprising a sliding connector.

More particularly, a device for connecting a communications terminal is disclosed, the device comprising a male connector which is to be connected to a female connector of said communications terminal, the device being characterised in that it comprises a base to which said male connector is fixed, said base comprising at least one slide.

Thus, the connection device can move along a given sliding axis and can make it easier to connect and disconnect the communications terminal. With such a device, there is thus no longer any need to press forcefully on the screen of the communications terminal in order to extract this terminal.

According to one particular characteristic, the base furthermore comprises at least one return element.

Thus, this return element can facilitate the operations of connection and disconnection of said communications terminal in accompanying the translational motion by maintaining both positions for the connection device: a waiting position and an operating position.

According to one particular embodiment, said male connector is a micro-USB connector.

According to one particular embodiment, said male connector is a Lightning™ connector.

According to one particular embodiment, said male connector is a C-type USB connector.

According to one particular characteristic, said at least one slide comprises a groove made in said base.

Thus, an exemplary embodiment of the disclosure offers a simple means for manufacturing the mobile base.

According to one particular embodiment, said base comprises at least two retaining walls capable of maintaining said base in a sliding position.

According to one particular characteristic, when said connection device is placed in said payment device, the connection device is covered with a holding plate.

According to another aspect, the disclosure relates to a payment device comprising a payment terminal and a housing for docking a communications terminal. Such a device comprises a connection device within said housing for docking.

According to a complementary characteristic, said slide of said connection device relates to complementary sliding elements made within a specific position in said housing for docking. According to one particular characteristic, said sliding element of the connection device takes the form of one or more grooves and said complementary sliding element of the housing for docking take the form of one or more tongues. The reverse can also be implemented according to one complementary embodiment.

4. DRAWINGS

These features as well as others shall appear more clearly from the following description of a one embodiment, given by way of a simple, illustrative and non-exhaustive example, and from the appended drawings, of which:

FIG. 1a, already commented upon is a perspective of the prior-art electronic payment device;

FIG. 1b, already commented upon, is another three-quarter view of the electronic payment device of the prior art;

5. DESCRIPTION

5.1. General Principle

As indicated here above, the problem of docking and removal of the communications terminal is resolved by the addition, within the casing, of a translationally mobile male connector. The general principle of an exemplary embodiment of the disclosure is described with reference to FIGS. 2a and 2b.

Figure 1A:
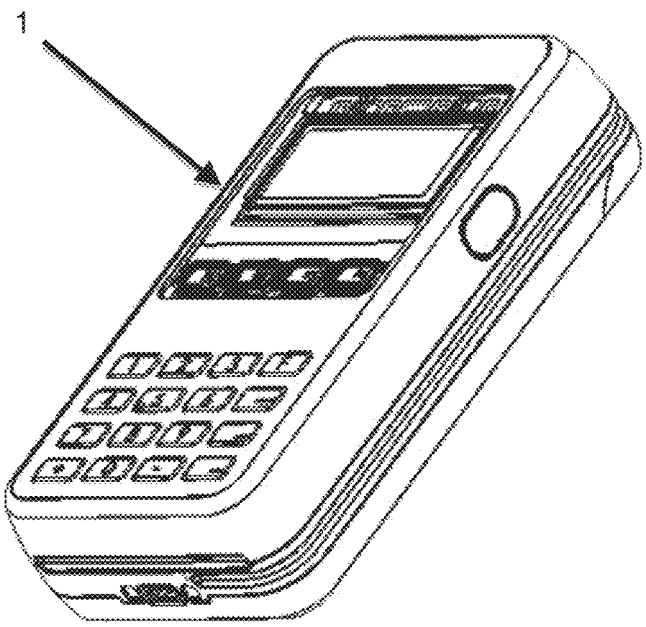
Figure 1B:
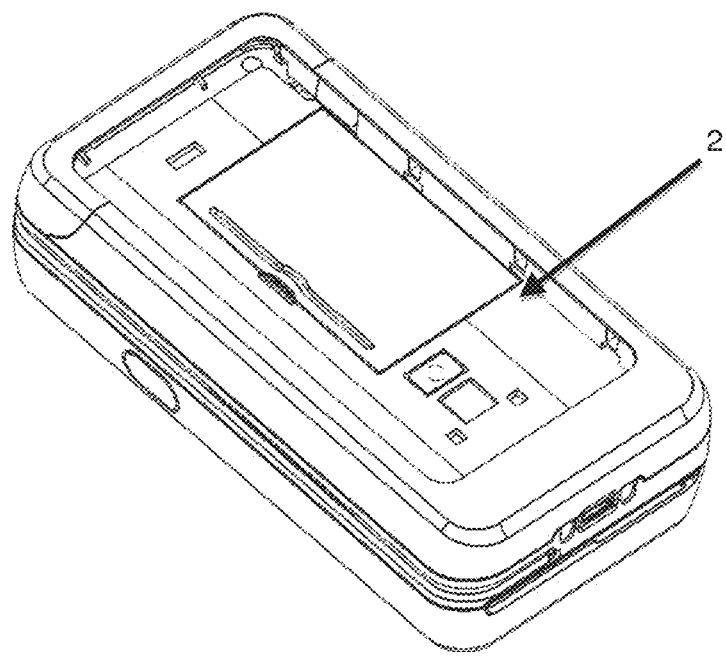
Figure 2A:
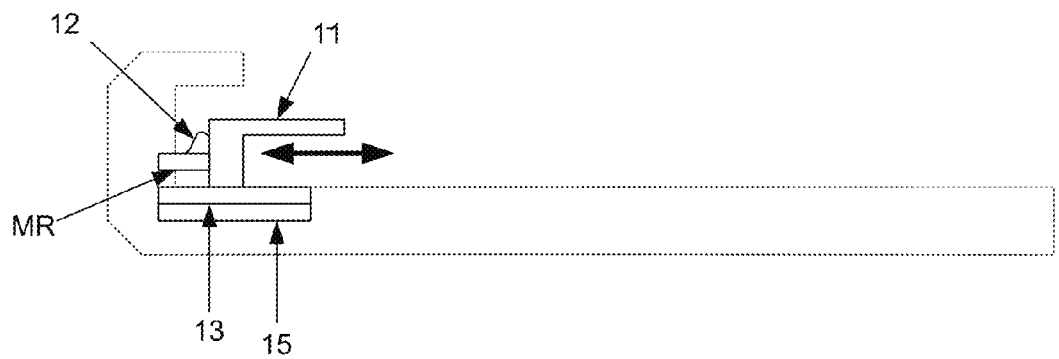
FIG. 2a is a view in section explaining the principle of the proposed technique.
Figure 2B:
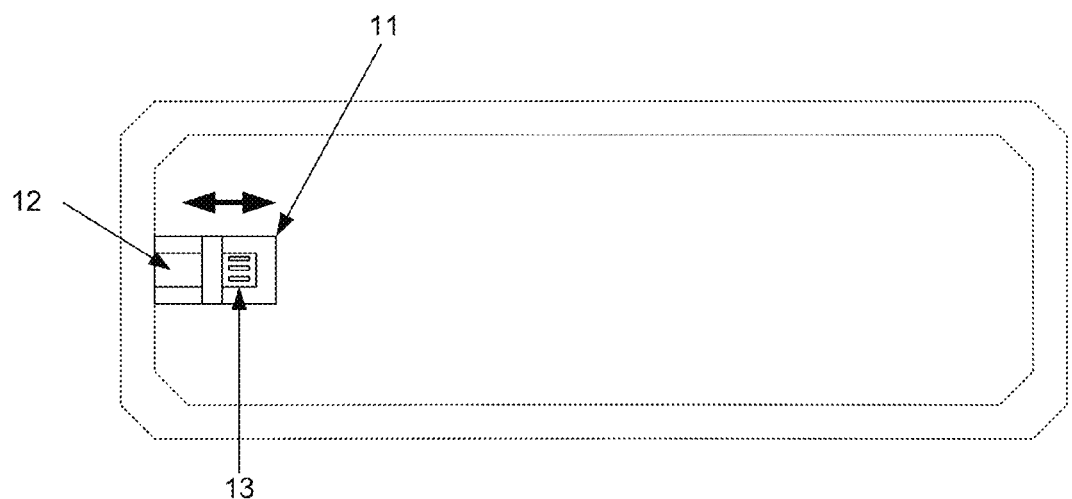
FIG. 2b is a top view explaining the principle of the proposed technique.
Figure 3A:
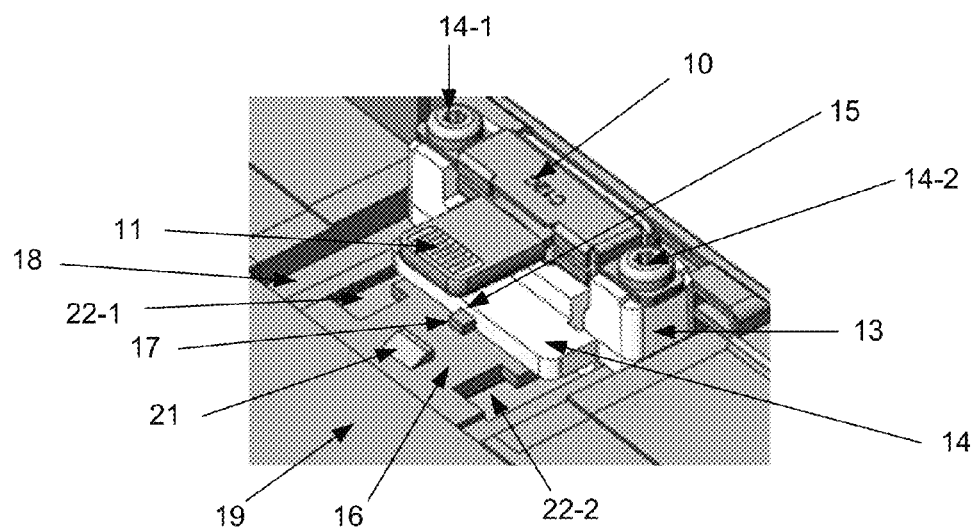
FIG. 3a is an illustration, in isometric form, of the sliding connector in a waiting position.
Figure 3B:
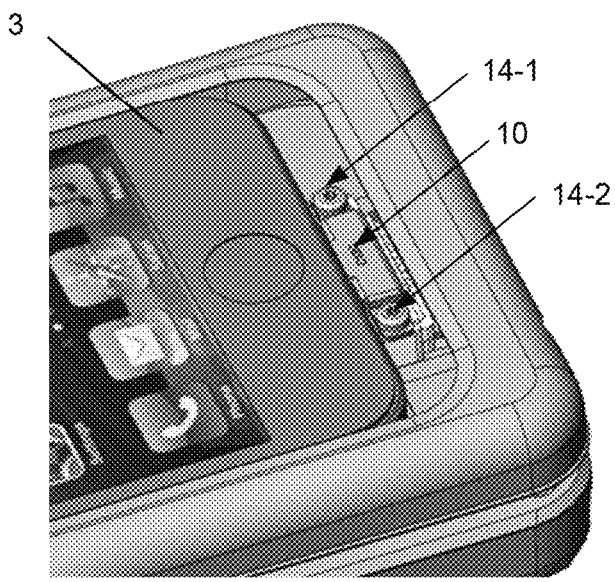
FIG. 3b is an illustration giving an isometric view of the housing for docking with which a terminal is docked, with the sliding connector in a waiting position.
Figure 4:
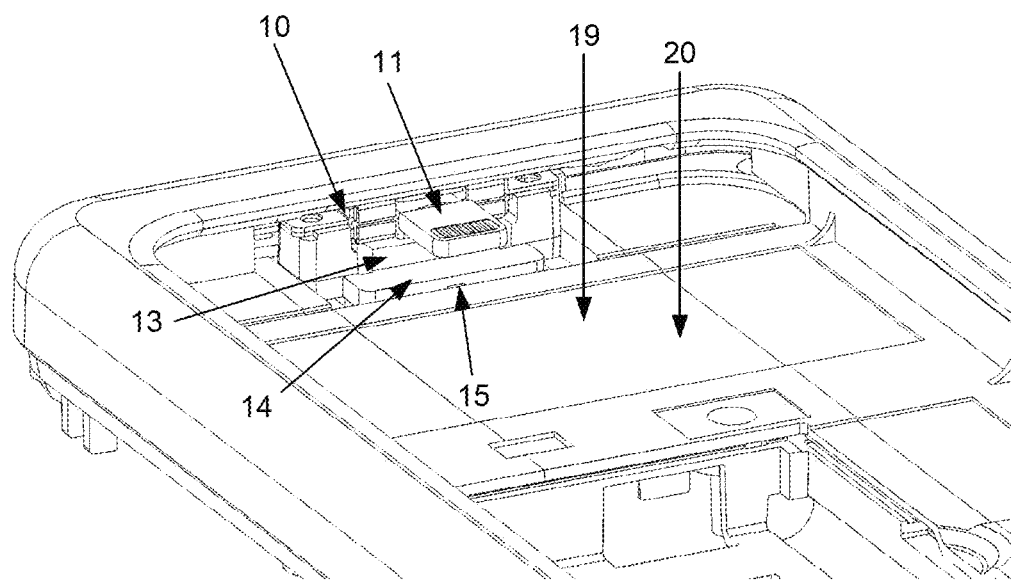
FIG. 4 is an isometric view of the housing for docking, with the sliding connector in a waiting position.
Figure 5:
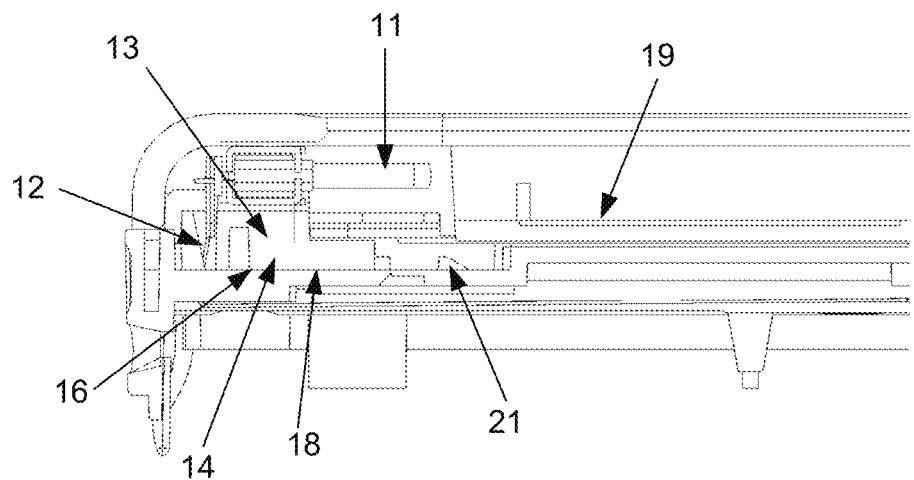
FIG. 5 is a partial view in section of the payment device.
Figure 6:
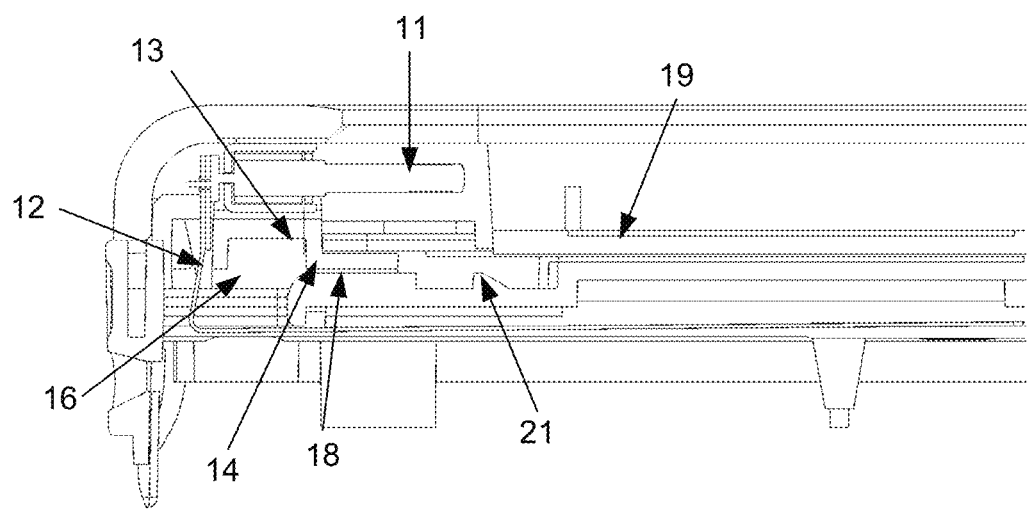
FIG. 6 is a partial view in section of the payment device with the connector also seen in section.

FIG. 2a is a view in section showing the principle of the implementing of the translationally mobile male connector. FIG. 2b represents a top view. The connector (11) is mounted on a support (13). The support (13) is mobile in a given direction. To this end, the general principle consists in providing the support with a groove (15) that matches a pad-like tongue (not shown in this figure). When the support is placed on the tongue, it therefore can slide in only one direction, which is the direction of docking and removal of the payment terminal. The groove is not obligatory. Any other sliding means such a slider can also be used, linked for example with a receiving rail. When the slide consists of a groove, the section of this groove is not necessarily a parallelepiped. This section can be semi-circular or again it can be triangular.

The connector (11) for its part is connected to a motherboard or to a power supply board of the payment device by means of a flex (12). This flex (12) enables a movement of the support and permanent connectivity of the connector.

In a complementary way, the connector support is associated with a return element (MR) (for example a spring or a leaf spring) used to make the support abut a stop element or abutment element (a stop tooth or an abutment tooth) when no terminal is docked with the reception housing. More specifically, when there is no terminal in the housing, the support is pushed to an abutment position so as to be kept in a first position known as a waiting position. When a terminal is being docked, this terminal exerts pressure on the support by means of the male connector. The support therefore slides during the docking up to a second position called an operating position. The action of the return element is cancelled out by the closing of the hatch used for docking the terminal. Naturally, this is an example of an implementation. I It is quite possible not to use a return element without in any way vitiating the advantages provided by the present technique.

The addition of the mobile male connector has two advantages: the first advantage is related to the fact that the male connector of the casing is visible when no communications terminal is docked. It is thus easy to verify the state of this male connector and thus detect, on the one hand, deterioration in this connector if any and, on the other hand, any possible attempt at fraud. Indeed, there exist fraudulent devices such as connector covers which are placed on or fitted into the existing male connector and serve to intercept and/or modify data travelling through this terminal by means of this connector.

The second advantage is related to the docking or removal of the communications terminal. Indeed, the translationally mobile male connector makes it possible, when docking the communications terminal, on the one hand to view the docking step and, on the other hand, to ascertain that the male connector has or has not been properly inserted into the female connector. Thus, deterioration is prevented in both the male connector and the female connector. (indeed, it can happen that it is the female connector of the communications terminal that has deteriorated and that this deterioration cannot be immediately perceived by the user). Furthermore, the translationally mobile male connector also enables gradual insertion of the male connector into the female connector. The mobility in translation enables the communications terminal to be docked in the same motion as the backward motion of the translationally mobile male connector, as and when it is inserted. Besides, this gradual effect can also be increased in one embodiment by the addition, between the mobile connector and the bottom of the casing, of a return element (of the spring or leaf spring type) which offers a certain force of resistance to docking.

In addition, the translationally mobile male connector makes it possible, during the extraction of the communications terminal, to facilitate the motion of translation of the communications terminal. Indeed, the separation of the female connector from the communications terminal and of the male connector from the casing entails a certain degree of difficulty (as explained here above). The mobility of the connector is a simple and effective response to this problem: this mobility makes it possible to carry out a simple motion of translation; the communications terminal and the mobile connector slide concertedly, in being nested with each other, up to an abutment point of the mobile connector; this translation creates an empty space within the casing around the base of the communications terminal. This empty space advantageously serves for the insertion of a finger or an object which is then used to push the communications terminal out of the casing. We therefore have a two-stage extraction: in a first stage, the connector accompanies the communications terminal during the motion of translation (during the sliding) and in a second stage, the user extracts the communications terminal by pushing its base, on either side of the connector, using for this purpose the space left vacant at the end of the sliding process. Besides, depending on the length of the abutment as compared with the bottom of the casing, the terminal can also be extracted by pulling on the top of the terminal (by exerting pressure with two fingers on the edge of the terminal) and by pulling it.

Besides, this preliminary sliding effect can also be increased, in one embodiment, by the addition between the mobile connector and the bottom of the casing, of a return element (of a spring or leaf spring type) which provides for a certain thrust force when extracting the communications terminal. This force can thus be exerted as soon as the docking/extraction hatch for the communications terminal is opened: when the hatch is opened the return element can then exert thrust force without any obstacles so that the male connector returns to an initial position. Naturally, the return force exerted is adapted to requirements: i.e. whether the connector mobile in translation has to be capable of extracting the communications terminal alone or, rather, whether it should be only an aid to pushing the terminal out of the housing.

5.2 Description of One Embodiment

Referring to FIGS. 3a, 3b, 4, 5, and 6, we now describe one embodiment of the layout of the mobile male connector. In this embodiment, it is sought to enable the docking and removal of Apple™ communications terminals comprising a Lightning™ type connector. The Apple™ Lightning™ male connector can slide in order to facilitate the docking and extraction of the peripheral into and out of its housing (spring effect and and/or the creation of a gripping area)

This sliding connector (10) comprises a male connector (11) connected to a motherboard (not shown) by means of flexible printed circuit (12). This male connector (11) is metallic and fixed to a transactionally mobile base (13) made of plastic. The connector (11) in this embodiment is fixed to the mobile base (13), for example by two Torx head screws (14-1, 14-2) situated on either side of the base (13) and on either side of the connector (11). The type of attachment or screw used is not necessarily of great importance. However, given the thrust and tensile forces exerted, the use of Torx head screws has an advantage because they can easily be adapted to plastic. The translationally mobile base (13) comprises a pedestal (14). For greater clarity of the description, the base and pedestal coincide with each other. At its centre, this base has a groove (15) which extends longitudinally in the sliding axis of the connector (10). This groove (15) makes it possible to pattern the sliding axis of the mobile connector (10). Indeed, the base is placed on a flat surface (16) comprising a tongue (17) patterned to get inserted into the groove (15) of the pedestal (14) and ensure high stability and motion only in the longitudinal sense. Naturally, this is an illustrative embodiment. Other shapes, types and numbers of tongues and grooves can be used. The pedestal also has two retaining walls extending on either side of the pedestal perpendicularly to the groove. These two walls are used to maintain the mobile connector in position and prevent it from coming out of its housing unexpectedly.

The flat surface (16) of the housing for receiving is situated in a plane (18) slightly lower than the general plane (19) for receiving the communications terminal (as shown by communications terminal 3 in FIG. 3b) within the housing. This protects the plane of translation of the mobile connector with a concealment plate (20) which therefore is situated in the general plane (19) for receiving the communications terminal.

The flat surface of the housing for receiving also has an abutment tooth (21) used to stop the translational motion of the mobile connector (10). Besides, at the end of its travel, at the abutment tooth, two side holes (22-1, 22-2) are also made in order to enable the extraction of the mobile connector if need be (for example for maintenance when the connector is damaged). These two holes enable the connector to be extracted at a desired place, where a location is made for the retaining walls.

An exemplary embodiment of the proposed solution is free of at least some of the drawbacks of the prior art.

The invention claimed is:

1. A device for connecting to a communications terminal, the device comprising:
   a flat surface;
   a male connector, which is configured to be connected to a female connector of said communications terminal; and
   a mobile base to which said male connector is fixed, said mobile base being placed on the flat surface; and
   a tongue and groove connection between the mobile base and the flat surface, which extends longitudinally along a sliding axis, wherein said mobile base is slidable on the flat surface along the sliding axis.

2. The device according to claim 1, wherein the mobile base is slidable between a waiting position and an operating position, and also comprises at least one return element, which pushes the mobile base to the waiting position.

3. The device according to claim 1, wherein said male connector is a micro-USB connector.

4. The device according to claim 1, wherein said male connector is a Lightning connector.

5. The device according to claim 1, wherein said male connector is a C-type USB connector.

6. A payment device comprising:
   a payment terminal;
   a housing connected to the payment terminal for docking a communications terminal; and
   a connection device within said housing for docking, the connection device comprising:
      a flat surface;
      a male connector, which is configured to be connected to a female connector of said communications terminal enabling the payment terminal to communicate with a remote server through the communications terminal; and
      a mobile base to which said male connector is fixed, said mobile base being placed on the flat surface; and a tongue and groove connection between the mobile base and the flat surface, which extends longitudinally along a sliding axis, wherein said mobile base is slidable on the flat surface along the sliding axis.

* * * * *